March 30, 1965  F. W. LINDBLOM  3,175,225
SUSPENSION DEVICE FOR HARD HAT
Filed Oct. 1, 1962
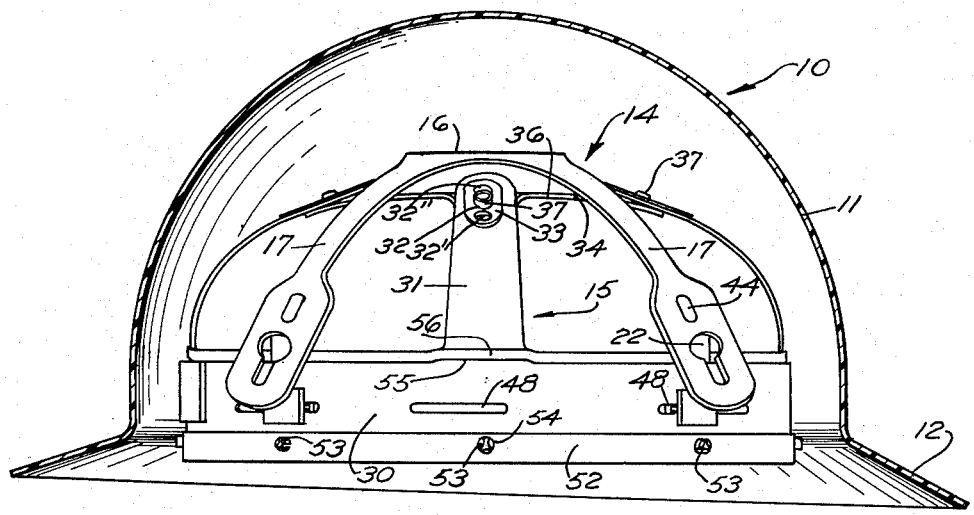
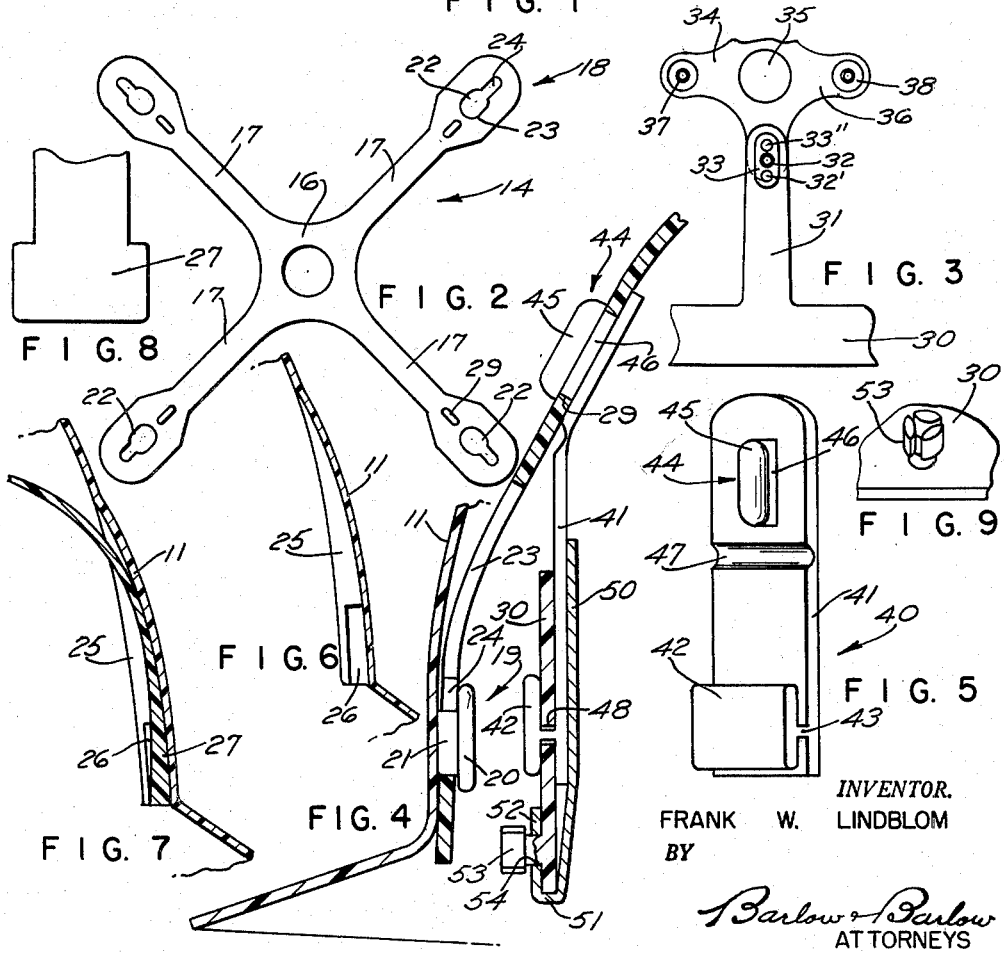
INVENTOR.
FRANK W. LINDBLOM
BY
Barlow & Barlow
ATTORNEYS

United States Patent Office 3,175,225
Patented Mar. 30, 1965

3,175,225
SUSPENSION DEVICE FOR HARD HAT
Frank W. Lindblom, Warwick, R.I., assignor to Welsh Manufacturing Company, a corporation of Rhode Island
Filed Oct. 1, 1962, Ser. No. 227,337
5 Claims. (Cl. 2—3)

This invention relates to a safety hat frequently called a hard hat and more particularly to the suspension for positioning the hat upon the head.

In the use of hard hats which are made of a rigid reinforced plastic material, some means must be utilized within the hat in order to position it upon the head. Such suspension must provide for different head sizes and also be comfortable to the wearer.

One of the objects of this invention is to provide a suspension device which will be of such a character that should the primary or main suspension device fail in any way from a blow on the hat, then there will be an auxiliary suspension which will protect the head of the wearer from the hat striking the head of the wearer.

Another object of the invention is to provide in the main suspension device an adjustment as to head size, particularly an adjustment as to the straps which will rest on the top of the head for suspending the hat in position.

Another object of the invention is to utilize the means for securing the auxiliary suspension to the hard hat for also securing the main suspension therein.

With these and other objects in view, the invention consists of certain novel features of construction as will be more fully described and particularly pointed out in the appended claims.

In the accompanying drawings:

FIG. 1 is a sectional view of a hard hat but illustrating the suspension in full.

FIG. 2 is a top plan view of the auxiliary suspension before being positioned in the hat;

FIG. 3 is a fragmental view showing the encircling band connected to the top member;

FIG. 4 is a sectional view showing the relationship of the hat, the auxiliary suspension connected thereto and the main suspension connected to the auxiliary suspension;

FIG. 5 is a perspective view of the member which connects the main and auxiliary suspensions;

FIG. 6 is a sectional view illustrating a fragmental portion of a hard hat providing a different form of connection of the auxiliary suspension thereto;

FIG. 7 is a view similar to FIG. 6 but illustrating the auxiliary suspension in place;

FIG. 8 is an elevation of the portion of the auxiliary suspension which is connected to the hat as in FIG. 7; and FIG. 9 is a perspective view of one of the resilient studs.

In proceeding with this invention, in order to suspend the hard hat in position, I have provided connections such as four buttons which extend through the crown portion of the hard hat adjacent the rim or T slot connections adjacent the rim, and onto these connections I secure an auxiliary suspension which in turn supports a headband to encircle the head and also a main suspension which is spaced therefrom so as to position the auxiliary suspension between the main suspension and the crown of the hard hat so that should the main suspension be ruptured because of blow on top of the hard hat, the head will then be engaged by the auxiliary suspension which must also rupture before the hard hat crown itself engages the head. Both suspensions are in generally the form of a cross formed from strip material.

With reference to the drawings, 10 designates generally a hard hat comprising a crown portion 11 and a rim portion 12. This hard hat is of a resin or plastic material reinforced with Fiberglas or some fibrous reinforcing materials so that a relatively rigid hat is provided. This hat is for safety purposes to protect the head of the wearer and is designed to withstand a blow which might be had from a falling object. Some suspension in the form of a softer head engaging means must be provided for maintaining the hat on the head in order that there might be some protection for the head should some blow be had on the crown of the hat, and I have shown both a main and an auxiliary suspension device for this purpose in FIG. 1, the auxiliary suspension device being shown in FIG. 2 designated 14 and the main suspension device being designated 15. These are both mounted one in superimposed relation to the other within the crown portion 11 of the hard hat.

The auxiliary suspension designated generally 14 is shown in one of its forms in plan view in FIG. 2 and comprises a central hub portion 16 with arms 17 radiating therefrom. In this particular showing four such arms are provided with some means 18 at the ends of the arms to attach these radiating arms to the hard hat.

In FIG. 2 the means 18 comprises a keyhole opening 22 having an enlarged portion 23 to fit over the head 20 of a button secured to the hat 11 (FIG. 4) and a narrower opening 24 to engage the neck 21 of the button and thus support the auxiliary suspension in the hat by means 18 engaging a button on the hat. However, in some cases a different form of connection of this auxiliary means may be had to the hat, and I have shown in FIGS. 6, 7 and 8 the hard hat as provided with a thickened portion at 25 with a slot therein as at 26, which slot merges into the inner surface of the hat, and in this case the means 18 on the radiating arm has a T-head 27 (FIG. 8) to slide into this slot and thus provide a connection for the radiating arm to the hat in a different manner. In both cases, however, each radiating arm will be provided with a slot 29 spaced inwardly toward the hub from the means 18 for connection to the hat which serves as a means for supporting from the hat the main suspension which is designated generally 15.

The main suspension 15 comprises a band 30 of a size to encircle the head. This band is conveniently made in two parts with one part overlapping the other and attached thereto by means of resilient studs on one part passing through openings on another part. The band 30 is of a plastic material and has arms 31 moldled integral therewith which extend upwardly at a plurality of locations which in this case I have provided as at four locations. These arms are each provided with a plurality of openings 32, 32′ and 32″ (FIG. 3) which are strengthened by a raised portion 33 molded integral with the arm. A top member 34, in substantially the form of a cross, is provided with a center opening 35 with four radiating fingers 36, each of which is provided with a stud 37 molded integral therewith and reinforced by a thickened portion 38. This stud is split so that it is resilient inwardly and is provided with a neck portion so that the stud 37 on each finger may be passed through a selected one of the openings 32, 32′ or 32″ in the arm 31.

The main suspension comprising the encircling band 30 and the upstanding arms joined through the top member 34 is nested within the auxiliary member designated generally 14 which is attached to the hat adjacent the rim thereof such as shown in FIG. 1 and is suspended in a position with the arms 31 about halfway between two arms 17 of the auxiliary member such as shown in FIG. 1. The main suspension 15 is held in this position by means of links designated generally 40, one of which is shown by itself in FIG. 5. These links comprise a shank 41 with a molded T-shaped head 42 and neck portion 43 at the lower end, while it is provided with a stud 44 with a head 45 and a neck 46 at its upper end with a weakened or thinned portion 47 between the two serving as a hinging point. This link 40 has its head 45 and stud 44 forced through the opening 29 in one of the radiating arms 17 so that the neck portion 46 lodges in this opening 29 while the head 45 retains it therein. The stud at the lower end has its head 42 passed through a slot 48 in the band 30 so that its neck portion 43 lies in this slot 48 with its head overlying the outer surface and suspends the band in position.

A sweatband 50 of leather is positioned along the inner surface of the band 30 and doubled back at its lower edge as at 51 with a portion 52 on the outer surface of the band where it may be secured by a stud 53 molded integral with the band 30. The openings 54 in the leather along this portion 52 originally are positioned a little closer together than are the studs 53 as shown in FIG. 1 so that the leather will have to be stretched somewhat in order to be positioned on these studs and thus the leather will be maintained tightly in position. Any sort of cementing means may be utilized for securing the ends of the leather in somewhat overlapping relation. In order to further and better hold the leather upright along the inner surface of the band 30, the leather is slitted at 55 (FIG. 1) at locations adjacent the upstanding arms 31 so as to provide a narrow strap 56 between the slit and the edge of the leather so that the arm 31 may be passed through this slit 55 and the band 56 will be on the outer surface of the arm 31 so as to assist in maintaining the sweatband 50 in position.

From the above it will be apparent that I have supported the auxiliary suspension 14 from the hat adjacent the rim thereof to a point which is spaced from the top of the crown of the hat and that, in addition, I have supported the main suspension which embraces the head from the hat through the lower enlarged portion of the auxiliary suspension by a link which is of a strength less than the strength of the enlarged portion of one of the radiating arms of the auxiliary suspension by which arrangement should a blow on the hat succeed in causing some part to give, the main suspension would first give through the weakened portion of the link connecting it to the auxiliary suspension whereupon the failure would then permit the head to engage the auxiliary suspension directly supported from the hat. Thus should the main suspension fail, the auxiliary suspension will come into operation to further support the head against any blows received, thus giving a second protection to the head in the case of the failure of the first.

Various known means may be utilized for adjusting the size of the headband carrying the leather sweatband, and the length of the slots 48 which support one suspension from the other permit of such adjustment.

I claim:

1. In a hard hat having an arcuate crown portion, a one unit auxiliary suspension device generally conforming to the arcuate crown portion and located within the same and spaced from the top portion thereof and comprising a center hub with radiating arms, and a second one unit main suspension device separate from said auxiliary unit device also generally conforming to the arcuate crown portion and located within the auxiliary suspenison device and spaced downwardly from the top portion thereof and comprising a head band, links extending from said arms to said head band connecting said units and means to attach the end portions of said arms to the lower part of the crown portion so as to position the devices in spaced relation to each other and to the upper part of the crown portion, said main suspension device comprising a top having radiating fingers, straps attached to said headband and attached to the fingers and depending therefrom.

2. In a hard hat as in claim 1 wherein said headband forming a portion of said suspension has as one piece therewith said straps.

3. In a hard hat as in claim 1 wherein said straps are adjustably attached to said finger parts and comprise a plurality of openings in one part and a button on the other part in a selected one of said openings.

4. In a hard hat as in claim 1 wherein said links are each provided with a head at its lower end and said headband forming a portion of said main suspension is slotted to receive each head and thus is contractably and expandibly supported by said link.

5. In a hard hat having an arcuate crown portion a main suspension device removably attached thereto, said main suspension device comprising a head band provided with a plurality of studs arranged at spaced intervals, a sweatband extending along the inner surface of said band and doubled back on itself over the lower edge of said band, said doubled back portion being provided with openings through which said studs extend to hold the sweatband in position, said openings in said sweatband doubled back portions being closer together than the spacing of said studs and said sweatband being stretched to a position to receive the studs through the openings whereby the sweatband is held taut.

References Cited by the Examiner

UNITED STATES PATENTS

| 2,813,270 | 11/57 | Barker | 2—3 |
| 2,994,087 | 8/61 | Trice | 2—3 |
| 3,008,145 | 11/61 | Austin et al. | 2—3 |
| 3,016,541 | 1/62 | Archbold | 2—3 |
| 3,026,523 | 3/62 | Bowers et al. | 2—3 |
| 3,087,164 | 4/63 | Gilbert | 2—3 |
| 3,087,165 | 4/63 | Cairns | 2—3 |

FOREIGN PATENTS

| 854,721 | 11/60 | Great Britain. |
| 154,042 | 4/56 | Sweden. |

JORDAN FRANKLIN, *Primary Examiner.*

DAVID J. WILLIAMOWSKY, *Examiner.*